United States Patent
Ball

Patent Number: 5,158,494
Date of Patent: Oct. 27, 1992

[54] RATTLING DEVICE FOR ATTRACTING ANIMALS

[76] Inventor: Mark O. Ball, P.O. Box 171, Senoia, Ga. 30276

[21] Appl. No.: 554,662

[22] Filed: Jul. 18, 1990

[51] Int. Cl.⁵ ............................................. A63H 5/00
[52] U.S. Cl. .................................... 446/419; 446/397
[58] Field of Search ............... 446/397, 402, 418, 419, 446/417, 404, 405, 406, 420, 421, 408; 84/404, 402 A, 402 C, 402

[56] References Cited

U.S. PATENT DOCUMENTS

| | | | |
|---|---|---|---|
| 1,401,859 | 12/1921 | Bailey | 446/419 |
| 3,129,527 | 4/1964 | Williams | 446/397 |
| 4,366,956 | 1/1983 | Kifferstein | 446/419 |
| 4,606,733 | 8/1986 | Willis | 446/397 |
| 4,610,641 | 9/1986 | Allen | 446/397 |
| 4,836,822 | 6/1989 | Finley et al. | 446/421 |
| 4,850,928 | 7/1989 | Stewart | 446/397 |
| 4,955,845 | 9/1990 | Piper | 446/397 |

OTHER PUBLICATIONS

Advertisement, Kelley Kalls-Deer & Deer Hunting Magazine Mar. 1990 vol. 13 #5-p. 83.
Advertisement, Rattling Sticks-Deer & Deer Hunting Equipment Cat. 101 Fall 1990 p. 79.
Article on Safety-North American Whitetail Magazine Jul. 1990 vol. 9 #3 by the Editor-Gordon Whittinton.
I know off another product on the market, called Rattlin, Sacks, or Rattlin Bags, consisting of a rectangular shaped bag from clothlike material, containing sticks which can be moved within the sack or bag to create a sound to attract deer etc.

*Primary Examiner*—Robert A. Hafer
*Assistant Examiner*—David J. Kenealy
*Attorney, Agent, or Firm*—Hopkins & Thomas

[57] ABSTRACT

A hand held device comprising a striker paddle (24) loosely contained within a mortise opening (20), and upon manipulation of the striker paddle (24) against the edges and fixed limits of the mortise opening (20) resonant sounds, effective for rattling in deer, elk, and like animals are emitted.

11 Claims, 1 Drawing Sheet

RATTLING DEVICE FOR ATTRACTING ANIMALS

BACKGROUND OF THE INVENTION

The invention is directed to equipment for attracting animals, particularly those of the antlered variety. The equipment including a striker paddle which is hand manipulated to cause it to strike the edges and fixed limits of a mortise opening in which it is loosely housed. The resonant sounds emitted effectively reproduce those sounds of actual antlered animals clashing their antlers together.

DESCRIPTION OF RELATED ART

Actual shed antlers were used for years for the purpose of attracting deer, elk, and like animals. The inventor himself, has used this method in past seasons. More recently synthetic antlers have been patented. Steward, U.S. Pat. No. 4,850,928, Jul. 25, 1989, and Allen, U.S. Pat. No. 4,610,641, Sep. 9, 1986, the purpose thereof is to imitate the sounds of clashing antlers.

SUMMARY OF THE INVENTION

While both actual antlers, and the synthetic varieties aforementioned in Stewart, U.S. Pat. No. 4,850,928, Jul. 25, 1989, Allen, U.S. Pat. No. 4,610,641, Sep. 9, 1986, could be effective in producing sounds to attract deer, elk, and like animals, the user however, is at risk of accidental self inflicted injuries from the sharp tines of these devices. For these devices to be effective the user must:

A. Hold one half of the device in one hand, and one half of the device in the other hand, and clash the two halves together, whereby the aforementioned injuries could easily occur.

B. Moreover, the user of these devices could easily become the target of a hunting accident by waving around devices that look exactly like real antlers which would also attract hunters.

C. The invention is rendered useless unless both hands are used to create the illusion of animals fighting, and using both hands increases the risk of accidents, due to the sharp tines.

D. These devices are bulky and difficult to transport in the woods.

Whereby my invention can:

A. With very little motion by the user, reproduce sounds effective for creating the illusion of actual antlered animals fighting.

B. My invention can produce the desired sound effects without requiring the user to hold the device with two hands, thereby freeing at least one hand for manipulation and aiming of a weapon or camera.

C. Furthermore, the desired sound effect will with very little experience and use, become readily apparent to the user.

D. My invention is durable for providing a long service life.

E. My invention resonant sounds will actually improve over time, the decibel levels produced by the device becoming greater as the material cures.

F. My invention can be carried in a shirt pocket.

In the preferred embodiment of the invention the main body houses the striker paddle loosely in its mortise opening. By mortise opening is meant a deep recess cut into wood or the like for any of a number of purposes. The striker paddle is manipulated within the confines and fixed limits of the mortise opening and caused to strike against the edges and fixed limits of the mortise opening reproducing sounds effective for rattling in deer, elk, and like animals. Preferably the main body is held in the right hand, while the left hand is wrapped loosely to cradle the call with the thumb in the thumb-notch. While holding the thumb of the left hand in place in the thumb-notch, twist the main body of the cell with the right hand using short, deliberate movements and cause the striker paddle to rock transversely relative to the main body to contact the edges and fixed limits of the mortise opening with force.

The one handed method entails cradling the main body of the call in either hand and using the thumb of that hand in the thumb-notch, to manipulate the striker paddle in various directions and to rock it transversely to obtain the desired sound when the striker paddle contacts the edges and fixed limits of the mortise opening. Thus, by providing a calling means the user achieves the desired sound effects of natural animal antlers when clashed together by the animals themselves, particularly the sound of deer, elk, and like animals, thus virtually assuring rattling effectivness at all times of the year, and virtually all areas of the country. With the above and other objects in view, that will hereinafter appear, the nature of the invention will be made clearly understood by reference to the appended claims and the several views illustrated in the accompanying drawings.

DESCRIPTION OF THE PREFERRED EMBODIMENT

Figure 1:
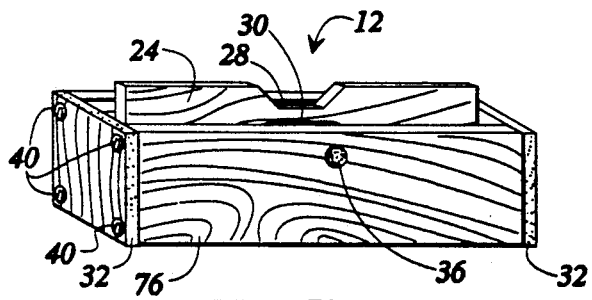
FIG. 1 is a perspective view of the rattling means constructed in accordance with the invention.
Figure 2:
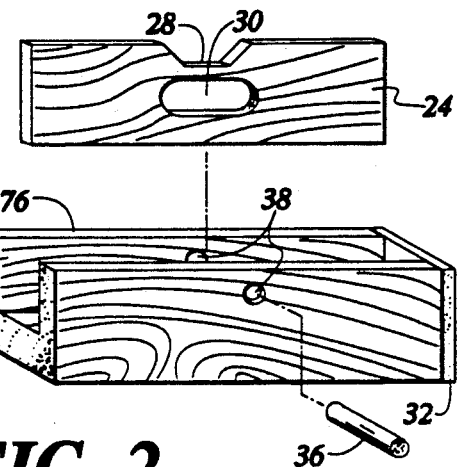
FIG. 2 is an exploded view of the rattling means.
Figure 3:
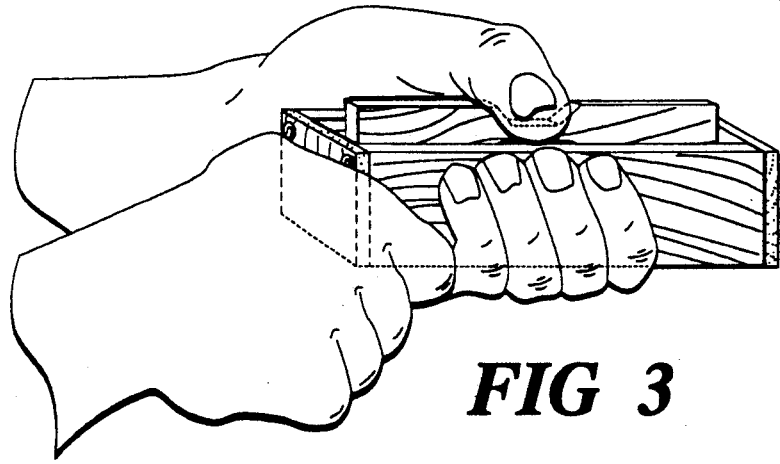
FIG. 3 is a perspective view of the rattling means, illustrating how the device is held with two hands.
Figure 4:
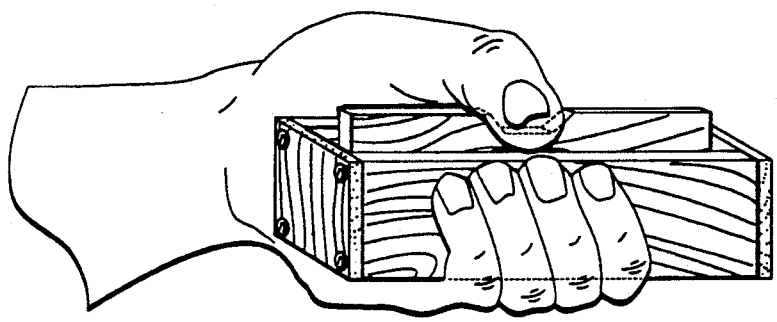
FIG. 4 is a perspective view of the calling means and illustrates the device cradled in the left hand.

Reference is made to FIG. 1 of the drawing which illustrates equipment for attracting deer, elk, and like animals, in the form of a rectangular shaped wooden box like device, comprising a main body #16, wherein the main body #16 contains a mortise opening #20, which loosely houses the striker paddle #24. The striker paddle #24, having a thickness and length less than that of the mortise opening #20, can be manipulated in many directions, as well as racked, and caused to contact the edges and fixed limits of the mortise opening #20. The striker paddle comprises an elongated slot #30, and a thumb-notch #28, both #30 and #28 are located near the center of the striker paddle #24, and moreover are located near the top of the striker paddle #24. A dowel pin #36 passes through the elongated slot #30 in the striker paddle #24 and is received into pressure fit holes #18 which are drilled through the main body #16. The purpose of the dowel pin #36 is to enable the striker paddle #24 to have free movement within the mortise opening #20 and to prevent the striker paddle #24 from falling out of its position. FIG. 2 is an exploded view of the equipment for calling in deer, elk, and like animals and illustrates the end plates #32, and their fastening means, screws #40. The end plates #42 receive contacted pressure from the striker paddle #24, when it is manipulated in the direction of the end plates #42. FIG. 3 is a perspective view of equipment for calling deer, elk, and like animals, and illustrates the user holding the calling means with the right hand gripping the main body #16, and the left hand cradling the calling means, #12 and placing the thumb of the left hand in the thumb-notch #28. FIG. 4 is a perspective view of equipment for calling deer, elk, and like animals, and illustrates the device #12, cradled in the left hand with the thumb of the left hand resting in the thumb-notch #28.

The device is preferably constructed of wood, however, plastics and other synthetic materials are also suitable and can accurately reproduce the desired sound. Where plastics or like materials are used, known construction methods such as injection molding may be employed for forming the device and the components thereof.

Although a preferred embodiment of the invention has been specifically illustrated and described herein, it is to be understood that minor variations including size and shape may be made in the apparatus without departing from the spirit and scope of the invention, as defined in the appended claims.

I claim:

1. Equipment for attracting deer, elk, and like animals comprising a longitudinally extending main body having a mortise type opening extending along at least a portion of the length of said main body, said opening having end walls and side walls within said main body, striker paddle means disposed in said opening, said striker paddle means comprising means disposed in said opening and having a lesser length and width than the inside limits of said main body, said paddle means having a width less than one half the distance between said side walls to provide a substantial distance for striking said side walls with substantial force for producing a loud sound therefrom and also comprising means free to move longitudinally and transversely within the limits of said opening, and means for loosely retaining said striker paddle means within said opening to permit said striker paddle means to be displaced longitudinally and transversely and to be transversely rocked relative to said main body to enable the user to manipulate said striker paddle means within the fixed limits of said mortise type opening to rapidly and safely reproduce sounds of actual animals' antlers being clashed, rubbed and scraped together.

2. The deer, elk, and like attracting equipment as defined in claim 1, wherein said main body is constructed of wood, and said mortise type opening in said main body is formed by a dado cut lengthwise the full length of said body.

3. The deer, elk, and like attracting equipment as defined in claim 2, wherein said main body has two end plates securely attached to form the ends of said mortise type opening.

4. The deer, elk, and like attracting equipment as defined in claim 3, wherein said end plates are securely fastened to opposite ends of said main body with a plurality of fastening devices.

5. The deer, elk, and like attracting equipment as defined in claim 1, wherein said means for retaining said striker paddle comprises a dowel pin of rigid material.

6. The deer, elk, and like attracting equipment as defined in claim 5, wherein said striker paddle has an elongated slot cut through said striker paddle and said elongated slot is of sufficient length and height to allow said striker paddle to be manipulated in said motions to contact the edges and fixed limits of said mortise type opening and be held loosely within said confines by means of said dowel pin.

7. The deer, elk, and like attracting equipment as defined in claim 1, wherein said striker paddle is of a lesser length and lesser width than the inside fixed limits of said mortise type opening in said main body, to facilitate its function of movement.

8. Equipment for attracting deer, elk, and like animals comprising a longitudinally extending main body having a mortise type opening extending along at lest a portion of the length of said main body, striker paddle means comprising means disposed in said opening having a lesser length and less width than the inside limits of said mortise type opening in said main body, means for loosely retaining said striker paddle means within said opening to permit longitudinal, transverse, and transverse rocking motions thereof relative to said main body, said striker paddle having upper and lower edges extending along its length and a thumb notch formed in its upper edge and having an elongated slot located at the center of said striker paddle just below said thumb notch whereby the user can manipulate said striker paddle within the fixed limits of said mortise type opening to safely reproduce sounds of actual animals' antlers being clashed, rubbed and scraped together.

9. The deer, elk, and like attracting equipment as defined in claim 8, and including a dowel pin disposed through said elongated slot, in said striker paddle, and said main body has side walls with holes therein, for receiving said dowel pins in each side wall, of said main body, and that the function of said dowel pins is to retain said striker paddle loosely within the fixed limits of said mortise type opening.

10. The equipment for attracting deer, elk, and like animals as claimed in claim 8, wherein said main body and said striker paddle are made of wood.

11. The deer, elk, and like attracting equipment as defined in claim 9, wherein said holes in said main body are of a smaller diameter than said dowel pin to create a friction fit of dowel pin.

* * * * *